United States Patent [19]

Greisman

[11] 4,019,946
[45] Apr. 26, 1977

[54] HEAT SEALING APPARATUS

[75] Inventor: Samuel Greisman, London, England

[73] Assignee: The Thames Sack and Bag Company Limited, London, England

[22] Filed: Feb. 14, 1975

[21] Appl. No.: 549,855

[30] Foreign Application Priority Data

Feb. 14, 1974 United Kingdom ............ 6832/74

[52] U.S. Cl. ................... 156/497; 53/373; 156/498; 156/499; 156/555
[51] Int. Cl.² .................................. B29D 23/00
[58] Field of Search .......... 156/203, 217, 218, 459, 156/465, 466, 497, 498, 499, 311, 555, 282; 34/46, 62, 65, 67; 219/388; 165/14, 61; 53/371, 373, 388, 28, 39, 44

[56] References Cited

UNITED STATES PATENTS

| | | | |
|---|---|---|---|
| 2,587,422 | 2/1952 | Wills | 156/466 |
| 2,928,220 | 3/1960 | Kannengiesser et al. | 53/373 |
| 3,488,244 | 1/1970 | Lepists | 156/498 |
| 3,767,510 | 10/1973 | Gustafson | 156/555 |
| 3,767,511 | 10/1973 | Slade | 156/555 |
| 3,770,550 | 11/1973 | Levitow | 156/555 |
| 3,775,222 | 11/1973 | Aspin et al. | 156/497 |
| 3,855,037 | 12/1974 | Imhagen et al. | 156/498 |
| 3,901,758 | 8/1975 | Humphries | 156/555 |

FOREIGN PATENTS OR APPLICATIONS 244,598   1969   U.S.S.R.

*Primary Examiner*—Caleb Weston
*Attorney, Agent, or Firm*—Brady, O'Boyle & Gates

[57] ABSTRACT

A hot air heat sealing apparatus for sealing together two layers of heat softenable plastics material comprising a fan, ducting arranged to divide the air stream from the fan into at least two flows, a heater disposed in the path of one of said flows, means by which air heated by the heater is directed in use onto the layers of plastics material thereby to soften said layers at a region thereof where they are to be sealed together, a pair of rollers arranged to nip the softened layers together to produce a seal, one of said pairs of rollers being mounted for pivotal movement radially relative to the other roller of said pair, means for pivotally moving said one roller whereby the nipping pressure exerted by the rollers can be varied and plastics material layers of different thickness can be accommodated and means for varying the inclination of the axes of the rollers relative to one another, whereby said axes can be brought into parallelism, and guide means disposed in the path of the other of said flows for guiding said other flow into contact with said layers above said region, to cool the area above said region whereby said layers are not softened above said region.

13 Claims, 8 Drawing Figures

HEAT SEALING APPARATUS

This invention relates to heat sealing apparatus, particularly hot air heat sealing apparatus for sealing together two layers of a heat softenable plastics material, e.g. for closing the mouth of a plastics bag or sack.

When a heat softenable plastics material bag or sack is sealed adjacent to its upper edge using currents of hot air, there is a risk that the plastics material above the seal will become softened and collapse, with the result that sealing may be impaired and that the bag or sack may catch in the sealing apparatus. This risk is greater with thin gauge plastics material than with thick gauge plastics material, since more heat must be present for the plastics material to soften in the case of thick gauge material. The risk may be greater with portable hand-held heat sealing apparatus than with apparatus which is not hand-held, since it may be necessary with hand-held apparatus to make the seal further from the top of the bag than with an apparatus which is not hand-held, with the result that the bag may have a greater tendency to collapse above the line of seal.

It is an object of a first aspect of the invention to provide a hot air heat sealing apparatus in which the above-mentioned disadvantage is obviated, or at least minimised.

According to a first aspect of the invention, there is provided a hot air heat sealing apparatus for sealing together two layers of heat softenable plastics material, e.g. for closing the mouth of a plastics bag or sack, comprising a fan, ducting arranged to divide the air stream from the fan into two flows a heater disposed in the path of one of said flows, means by which air heated by the heater is directed in use onto the layers of plastics material thereby to soften said layers at a region thereof where they are to be sealed together, and means for pressing the layers together to form a seal, guide means disposed in the path of the other of said flows for guiding said other flow into contact with said layers above said region, whereby said layers are substantially not softened above said region.

Advantageously, the air stream from said fan is divided into four flows, two of which are heated, and two of which are unheated. The ducting leading to the heater and that leading to the guide means is preferably arranged so as to leave a passage for the layers of plastics material, e.g. for the bag or sack, to pass through the apparatus. The guide means preferably define a channel (forming part of said passage) through which the part of the layers above said region pass in use and along which unheated air flows to prevent said part of the layers from being substantially softened. The channel may be defined by a one piece member which closes the channel at its top or by two side members which leave the channel open at both its top and its bottom. The channel preferably narrows towards its bottom.

Once the plastics material has been softened, by hot air or by other means, it has previously been proposed to provide a seal by means of a pair of crimping rollers. It is an object of a second aspect of the invention to provide a heat sealing apparatus having an improved crimping roller arrangement.

According to a second aspect of the invention, there is provided a heat sealing apparatus for sealing together two layers or a heat softenable plastics material, e.g. for closing the mouth of a plastics bag or sack, comprising means for softening the plastics material of the layers, a pair of rollers arranged to nip the softened layers together to produce a seal, one of said pairs of rollers being mounted for pivotal movement radially relative to the other roller of said pair, and means for pivotally moving said one roller whereby the nipping pressure exerted by the rollers can be varied and plastics material layers of a range of gauges can be accomodated.

Preferably said one roller is mounted in a bush bearing and the means for pivotally moving said one roller is a plunger arranged to bear against a member which is fixed in relation to said one roller, e.g. a bearing-containing block for said one roller. The plunger is preferably operated by a rotatable key.

A problem encountered with crimping rollers for heat sealing apparatus is that it is difficult to install the rollers in the apparatus with their axes parallel. It is an object of the invention to overcome, or at least to minimise this difficulty.

According to a third aspect of the invention, there is provided a heat sealing apparatus for sealing together two layers of a heat-softenable plastics material, e.g. for closing the mouth of a plastics bag or sack, comprising means for softening the plastics material of the layers, a pair of rollers arranged to nip the softened layers together to form a seal and means for varying the inclination of the axes of the rollers relative to one another, whereby said axes can be brought into parallelism.

Advantageously, said means comprises a set screw which bears against a cantilever arm which is fixed relative to one roller, e.g. on a bearing-containing block therefor.

a heat sealing apparatus according to the invention preferably incorporates all three aspects thereof but it may only incorporate any one or any two of the three aspects.

In order to enable the invention to be more readily understood reference will now be made to the accompanying drawings, which illustrate diagrammatically and by way of example an embodiment thereof, and in which.

Only the parts of the heat sealing apparatus with which the three aspects of the invention are concerned will be described in detail.

Figure 1:
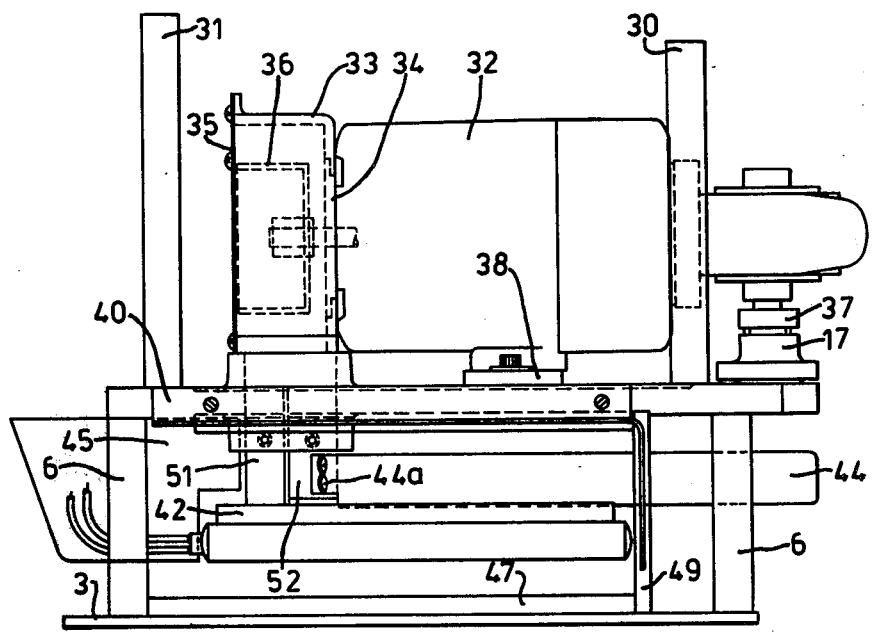
FIG. 1 is a side view of a portable hand-held heat sealing apparatus with the cover and handle removed.
Figure 2:
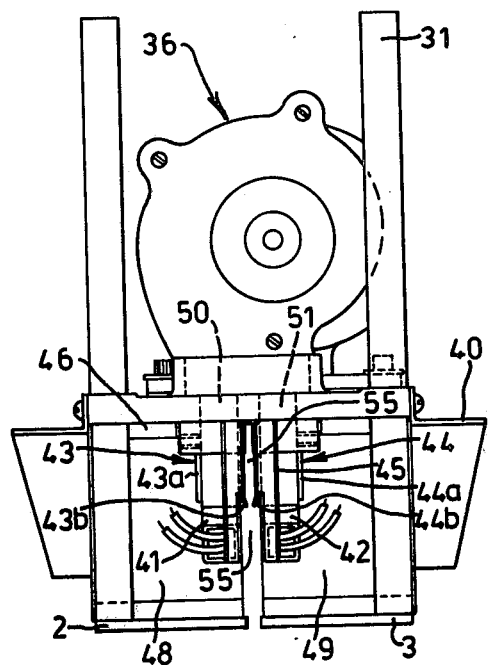
FIG. 2 is an end view of the apparatus shown in FIG. 1, also with the cover and the handle removed.
Figure 3:
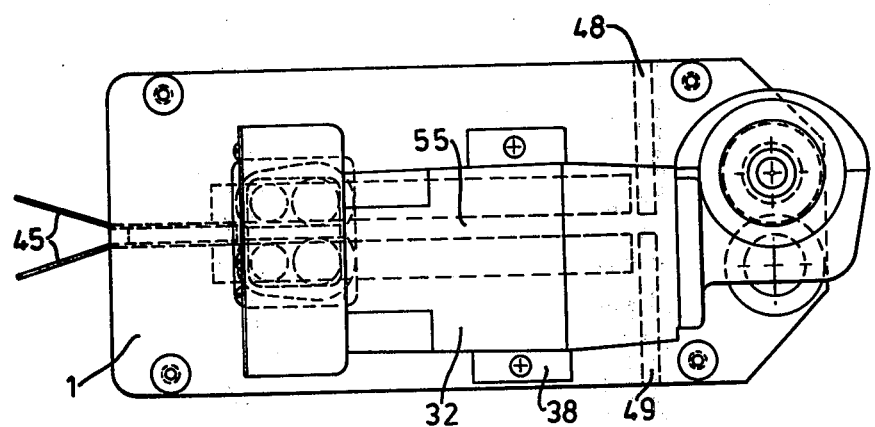
FIG. 3 is a plan view of the apparatus shown in FIGS. 1 and 2, certain internal parts being shown in broken outline.

Referring first to FIGS. 1 to 3, a heat sealing apparatus comprises a fan 36 connected to ducting which defines four distinct ducts 50, 51, 52 and 53. The ducts 50 and 51 lead to first and second heaters 41 and 42 respectively. Each heater comprises a heating cartridge surrounded by a jacket which is formed with holes positioned such that heated air emerging through the holes is directed on to a plastics material bag or sack passing through the apparatus. Each heating cartridge has a coil (not shown) around it to increase the effective surface area of the cartridge, and thus its heating effect.

An entry guide 45 is provided to facilitate passage of bags or sacks through a central passage 55 in the apparatus. First and second bag top guides 43 and 44 are provided on either side of the central passage 55 and define between them an upper channel 55' (the guides 43 and 44 have been omitted from FIG. 3 for the sake of clarity). The guides 43 and 44 are affixed at one end to the ducts 52 and 53 respectively by curved tab portions 43a and 44a. The lower edges of the guides 43 and 44 are inwardly turned towards one another, as can be seen from FIG. 2 at 43b and 44b (the major portions of the guides 43 and 44 are not visible in FIG. 2) The bottom ends of the ducts 52 and 53 are blanked off and slits are formed in their sides adjacent the internal faces of the guides 43 and 44. Thus air blown by the fan along the ducts 52 and 53 will issue through these slots and along the channel 55'.

In use, the heat sealer is moved relative to a bag to be sealed so that the top portion of the bag passes between the entry guides 45 and along the passage 55. Air is blown by the fan down the ducts 50 to 53. The air stream down the ducts 50, 51 is heated by the heater capsules 41 and 42 and issues from apertures in the sides of these capsules, so as to soften a region of the plastics bags below the top thereof. The air stream passing down the ducts 52 and 53 is not heated and issues from the slots in the ducts into and along the channel 55' between the guides, thus keeping the portion of the bag in the channel 55' cool and preventing it from being softened. There is thus little risk of the top portion of the bag collapsing and impairing the seal to be made subsequently or catching on part of the apparatus and obstructing withdrawal of the bag.

Figure 4:
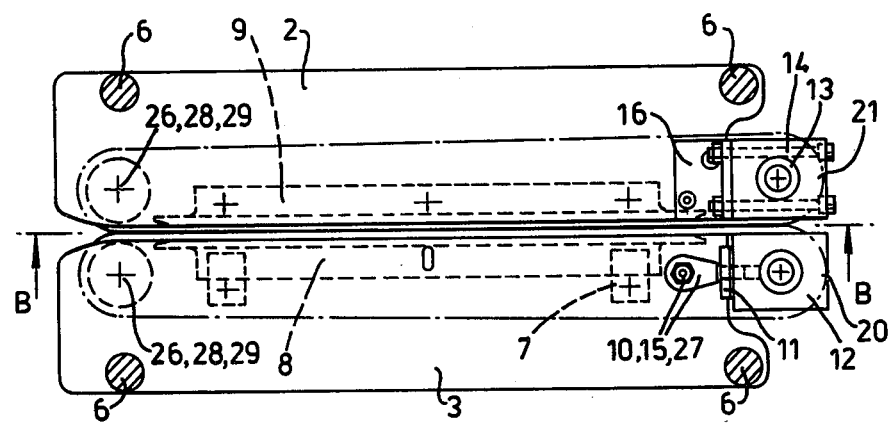
FIG. 4 is a plan view of part of the apparatus shown in FIGS. 1 to 3, certain parts of the apparatus shown in broken outline.
Figure 5:
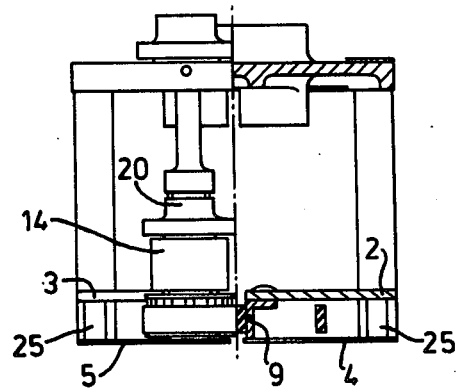
FIG. 5 is in part an end view in the direction of the arrow C and in part a sectional view at the position indicated by the arrow A.

Referring now to FIGS. 4 and 5, there is shown a pair of crimping rollers 20 and 21 which are arranged to nip softened plastics material between them and thereby to form a seal. As illustrated the roller 20 is knurled and that 21 is not, but it will be appreciated that the roller 20 could be plain and the roller 21 knurled, if desired. The roller 20 is mounted for pivotal movement about a pintle 10 on a ball bushing 15, so that the roller 20 can be moved radially towards and away from the roller 21.

Figure 6:
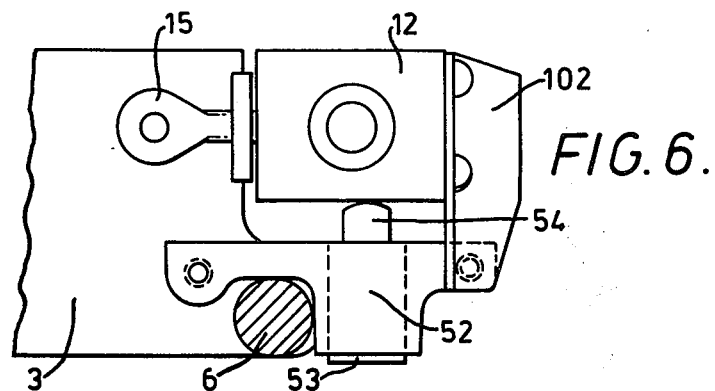
FIG. 6 is a top view of part of the apparatus shown in FIGS. 4 and 5.
Figure 7:
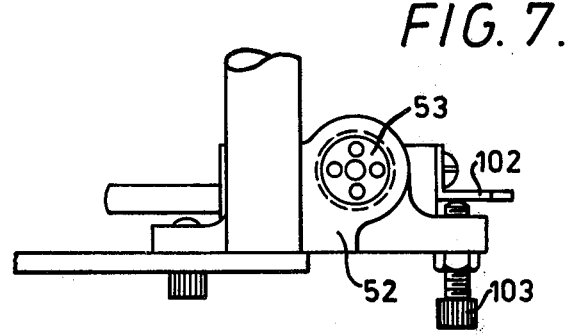
FIG. 7 is a side view of the part of the apparatus shown in FIG. 6.
Figure 8:
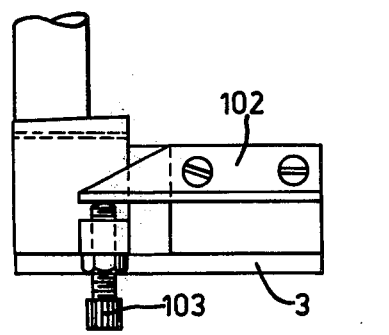
FIG. 8 is an end view of the part of the apparatus shown in FIGS. 6 and 7.

Referring now to FIGS. 6 to 8, there is again shown the ball bushing 15 by means of which the roller 20 (not shown) is pivotable relative to the other roller 21. A bearing for the roller 20 is shown in a bearing containing block 12. A plunger 54 is mounted in a housing block 52, and is rotatable by means of a key which is engageable with a complementary configuration 53 in the end of the plunger. On rotation of the key, the plunger moves inwardly or outwardly relative to the housing block 52, and since it bears on the bearing block 12, the roller 20 is thereby urged to pivot about the bushing 15 so as to move radially towards or away from the other roller 21. Thus by adjusting the plunger, the rollers can be made to accomodate plastics materials of larger or smaller gauge and the pressure exerted by the rollers can be varied.

A cantilever arm 102 is fixed to face of the bearing block 12 remote from the ball bushing 15, and a set screw bears against the under surface of the cantilever arm. The set screw passes through an extension passing from the housing block 52. On rotating the set screw, the cantilever arm is moved up or down, which in turn causes the roller 20 (not shown) to move so that the inclination of its axis to that of the other roller 21 is varied, whereby the axes of the rollers 20 and 21 can be brought into parallelism.

I claim:

1. A hot air heat sealing apparatus for sealing together two layers of heat softenable plastics material comprising a fan, ducting arranged to divide the air stream from the fan into at least two flows, a heater disposed in the path of one of said flows, means by which air heated by the heater is directed in use onto the layers of plastics material thereby to soften said layers at a region thereof where they are to be sealed together, means for pressing the layers together to form a seal, and guide means disposed in the path of the other of said flows for guiding said other flow into contact with said layers above said region, to cool the area above said region whereby said layers are not softened above said region.

2. A hot air sealing apparatus according to claim 1, wherein the air stream from said fan is divided into four flows, two of which are heated, and two of which are unheated.

3. A hot air sealing apparatus according to claim 1, wherein ducting leading to the heater and that leading to the guide means is arranged so as to leave a passage for the layers of plastics material to pass through the apparatus.

4. A hot air sealing apparatus according to claim 3, wherein the guide means defines a channel which forms part of said passage and through which the part of the layers above said region pass in use and along which unheated air flows to prevent said part of the layers from being softened.

5. A hot air sealing apparatus according to claim 4, wherein the channel is defined by a one-piece member which closes the channel at its top.

6. A hot air sealing apparatus according to claim 4, wherein the channel is defined by two side members which leave the channel open at both its top and its bottom.

7. A hot air sealing apparatus according to claim 4, wherein the channel narrows towards its bottom.

8. A heat sealing apparatus for sealing together two layers of a heat softenable plastics material, comprising blower means, heating means, first means connected to said blower means and including said therein heating means to direct heated air onto the layers of plastics material for softening the plastics material of the layers along a path, a pair of rollers arranged to nip the softened layers together along said path to produce a seal, second means connected to said blower means for simultaneously directing air at ambient temperature onto the plastics material closely adjacent to and above said path to cool said material, one roller of said pair of rollers being mounted for pivotal movement radially relative to the other roller of said pair, and means for pivotally moving said one roller whereby the nipping pressure exerted by the rollers can be varied and plastics material layers of different thickness can be accommodated.

9. A heat sealing apparatus according to claim 8, whrein said one roller is mounted in a bearing and the means for pivotally moving said one roller is a plunger arranged to bear against a member which is fixed in relation to said one roller.

10. A heat sealing apparatus according to claim 9, wherein the plunger is operated by a rotatable key.

11. A heat sealing apparatus for sealing together two layers of a heat-softenable plastics material, comprising blower means, heating means, first means connected to said blower means and including heating said means therein to direct heated air onto the layers of plastics material for softening the plastics layers of the material along a path, a pair of rollers arranged to nip the softened layers together along said path to form a seal, second means connected to said blower means for simultaneously directing air at ambient temperature onto the plastics material closely adjacent to and above said path to cool said material, and separate means for varying the inclination of the axes of the rollers relative to one another, whereby said axes can be brought into parallelism.

12. A heat sealing apparatus according to claim 11, wherein said separate means comprises a set screw which bears against a cantilever arm which is fixed relative to one roller.

13. A hot air heat sealing appartus for sealing together two layers of heat softenable plastics material comprising a fan, ducting arranged to divided the air stream from the fan into at least two flows, a heater disposed in the path of one of said flows, means by which air heated by the heater is directed in use onto the layers of plastics material thereby to soften said layers at a region thereof where they are to be sealed together, a pair of rollers arranged to nip the softened layers together to produce a seal, one of said pairs of rollers being mounted for pivotal movement radially relative to the other roller of said pair, means for pivotally moving said one roller whereby the nipping pressure exerted by the rollers can be varied and plastics material layers of different thickness can be accomodated and means for varying the inclination of the axes of the rollers relative to one another, whereby said axes can be brought into parallelism, and guide means disposed in the path of the other of said flows for guiding said other flow into contact with said layers above said region, to cool the area above said region whereby said layers are not softened above said region.

* * * * *